United States Patent [19]

Merrick et al.

[11] 4,283,617

[45] * Aug. 11, 1981

[54] AUTOMATIC PIPE WELDING SYSTEM

[75] Inventors: George J. Merrick, Franklin; George E. Cook, Brentwood; Donald D. Modglin, Nashville, all of Tenn.

[73] Assignee: Merrick Welding International, Inc., Nashville, Tenn.

[*] Notice: The portion of the term of this patent subsequent to Mar. 20, 1996, has been disclaimed.

[21] Appl. No.: 21,784

[22] Filed: Mar. 19, 1979

Related U.S. Application Data

[62] Division of Ser. No. 654,975, Feb. 3, 1976, Pat. No. 4,145,593.

[51] Int. Cl.³ ............................................. B23K 9/12
[52] U.S. Cl. .................................. 219/125.1; 219/61; 219/137.2
[58] Field of Search ............. 219/125.11, 125.1, 60 R, 219/60 A, 61, 137.2, 137 R

[56] References Cited

U.S. PATENT DOCUMENTS

| 3,122,629 | 2/1964 | Manz | 219/137.2 |
| 3,267,251 | 8/1966 | Anderson | 219/125.1 |
| 3,737,614 | 6/1973 | Paulange | 219/60 A |
| 4,145,593 | 3/1979 | Merrick et al. | 219/60 A |

OTHER PUBLICATIONS

A. J. Weissberger, "Microprocessors Simplify Industrial Control", Electronic Design 22, 10/25/75, pp. 96-98.

Primary Examiner—C. C. Shaw
Attorney, Agent, or Firm—Jones, Thomas & Askew

[57] ABSTRACT

Apparatus and method for rapid and automatic welding of joints which interconnect sections of pipe, and in particular oil or gas transmission pipe. The system includes at least one torch transport assembly which simultaneously moves one or more welding torches along a path parallel to the joint being welded. Selected operating parameters such as preheating power for the filler wire, of each welding torch are adjusted to accurately position each torch with respect to the joint, and to repeatably provide programmed welding parameters resulting in a uniform joint weld. The present system is disclosed in the context of hot-wire gas-tungsten arc welding torches.

4 Claims, 13 Drawing Figures

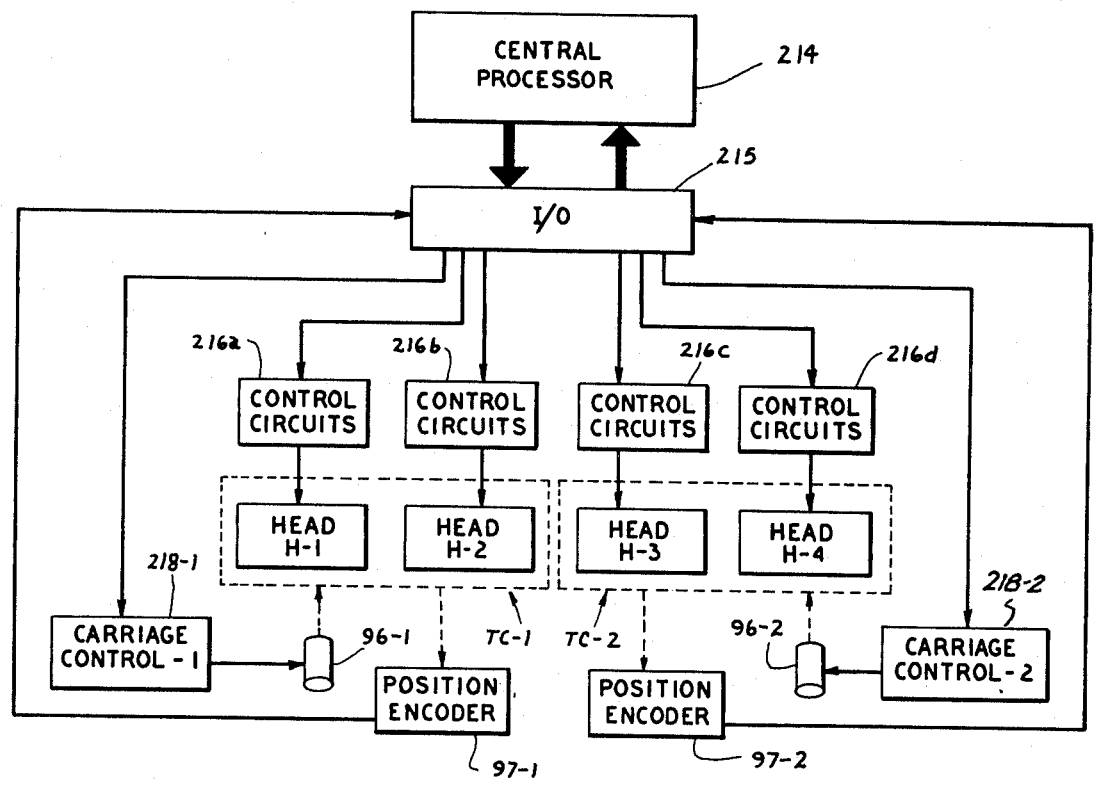
Fig_2
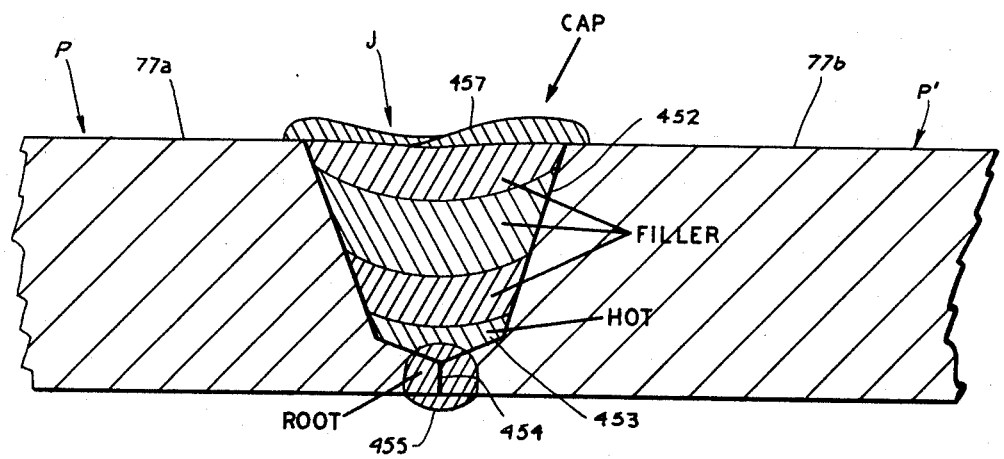
Fig_3

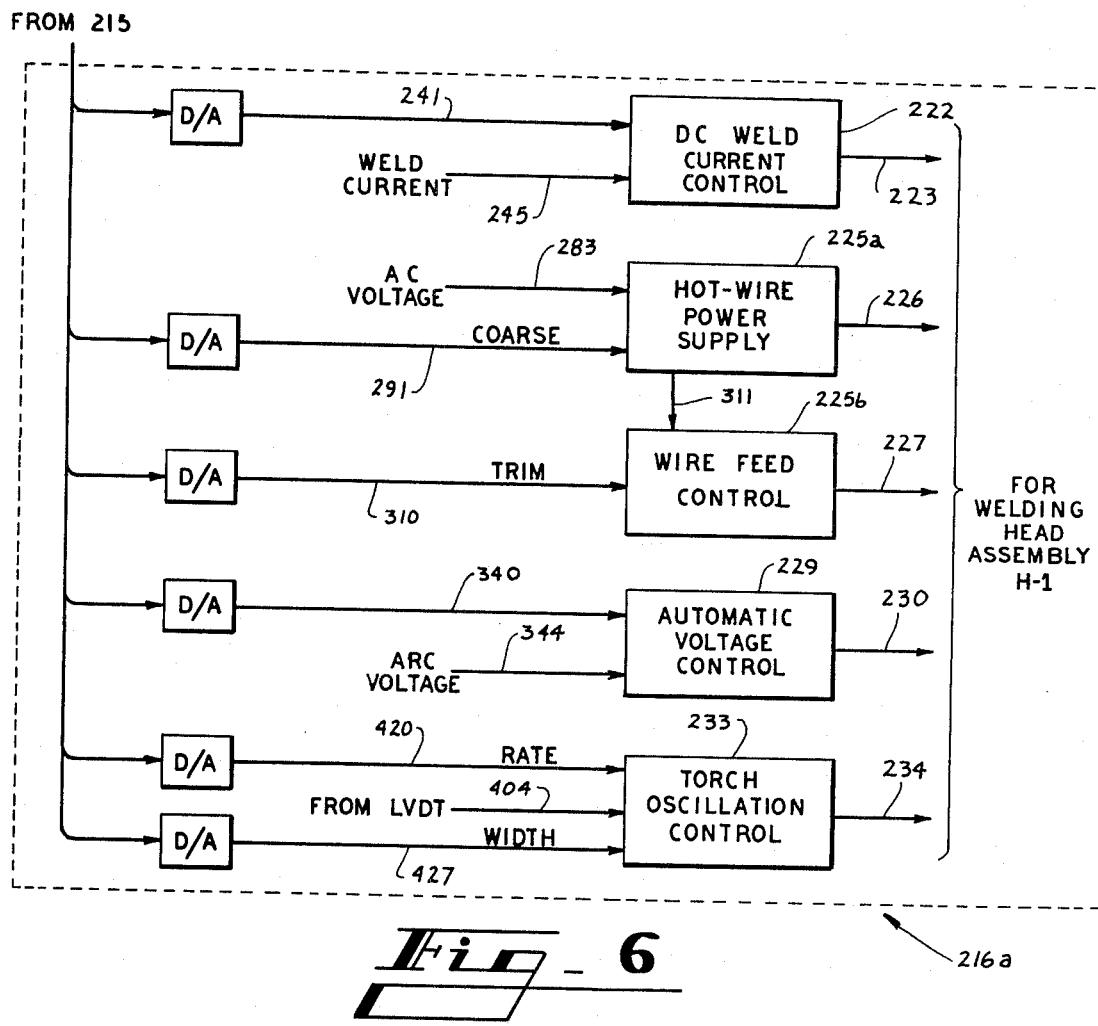
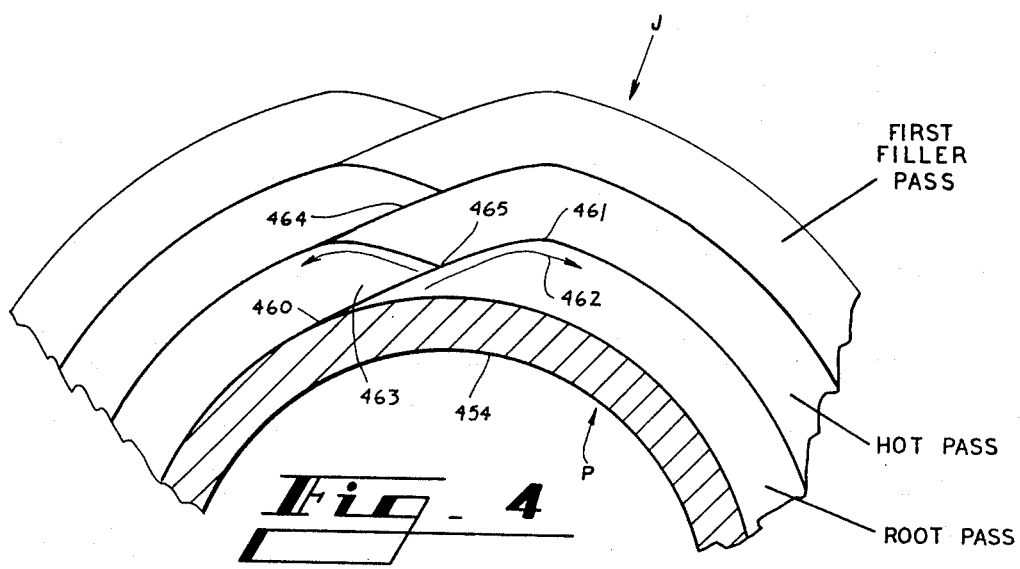

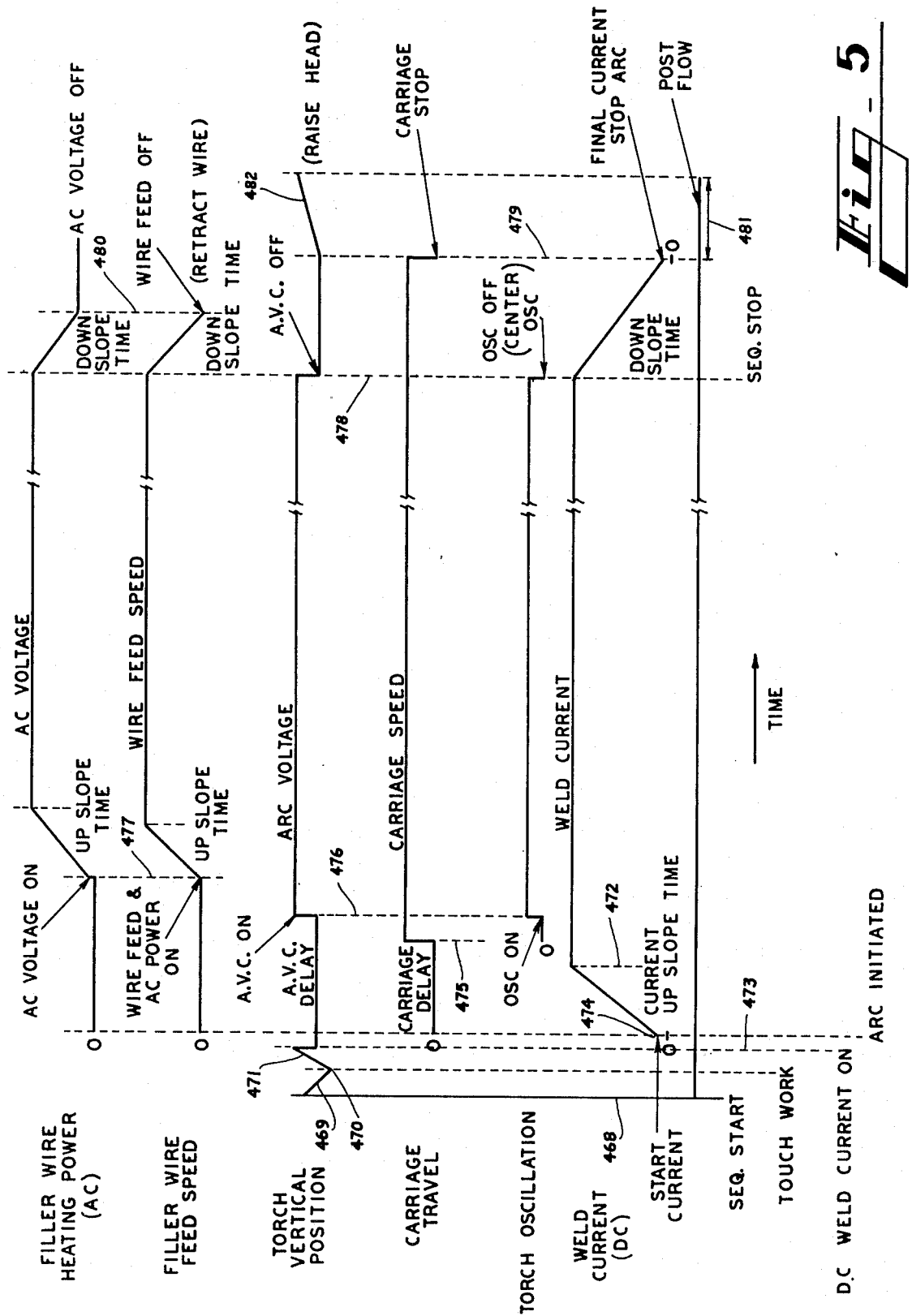

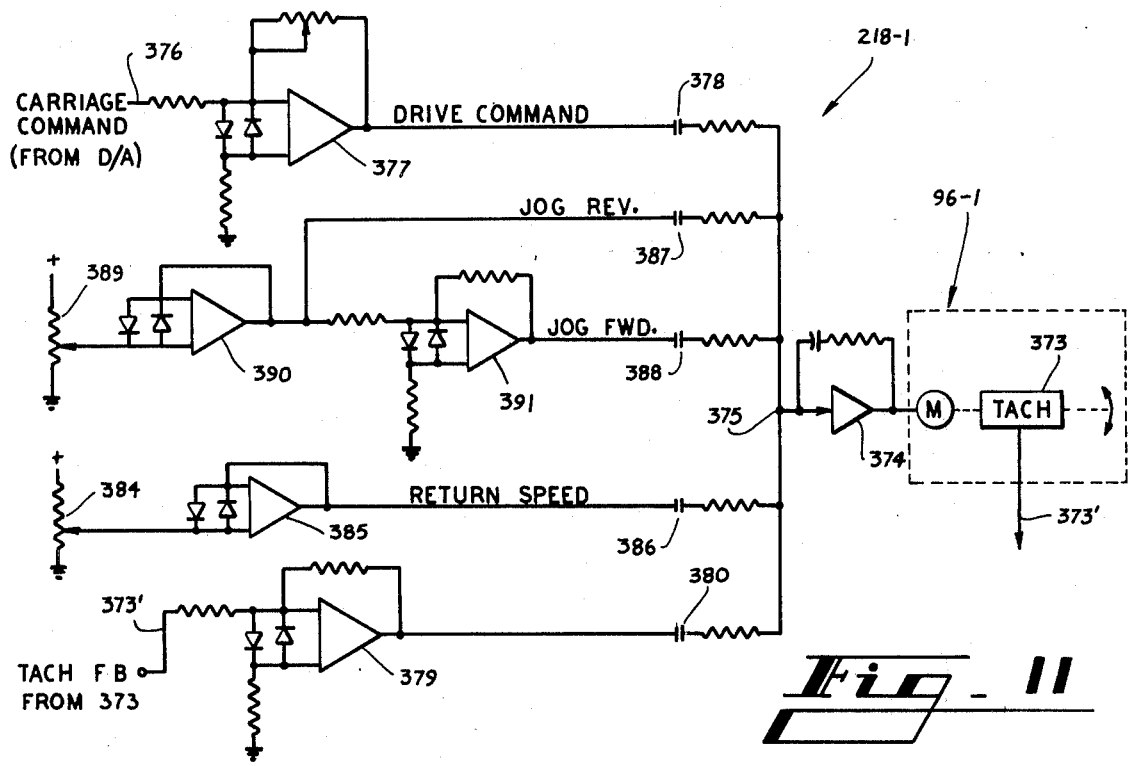

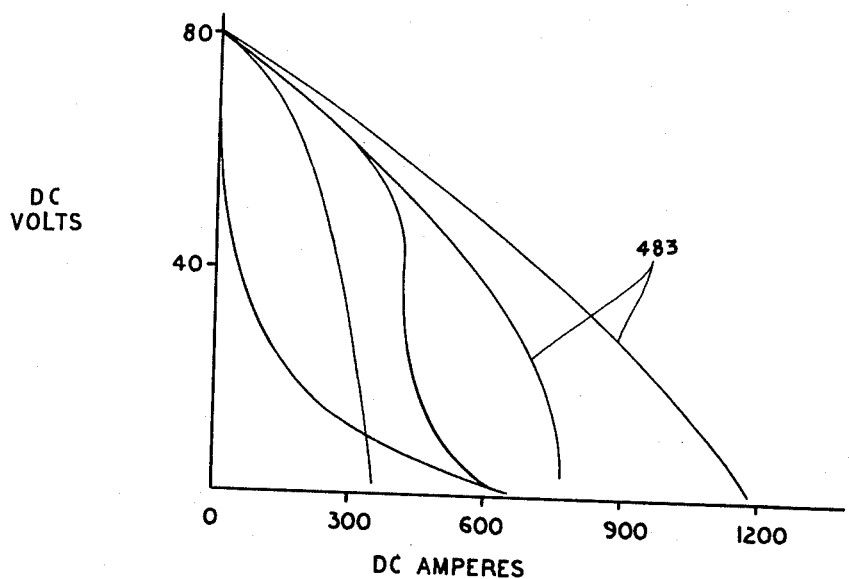
PRIOR ART
Fig_12
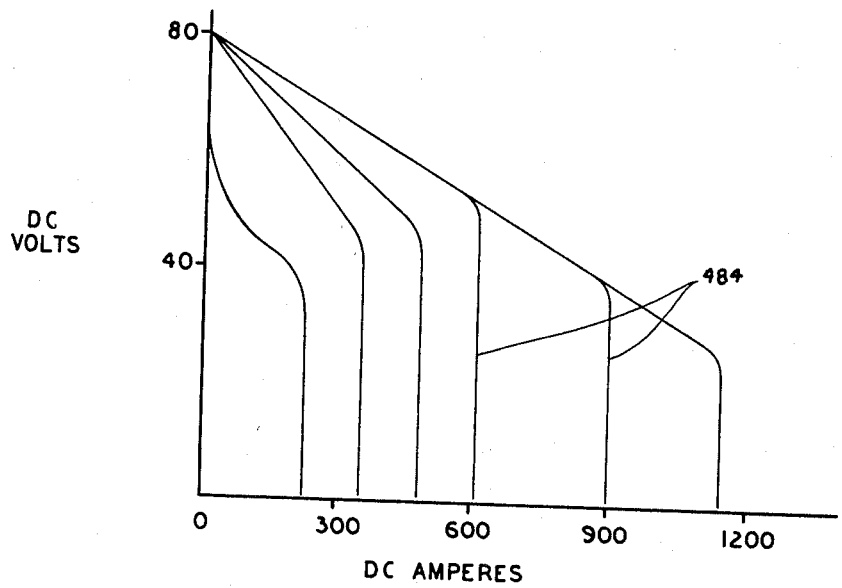
Fig_13

AUTOMATIC PIPE WELDING SYSTEM

This is a division of application Ser. No. 654,975, filed Feb. 3, 1976, now U.S. Pat. No. 4,145,593.

This invention reates in general to welding and in particular to the repeatable and precise control of welding parameters in applications where a welding torch is traversed with respect to a relatively stationary workpiece one example of which is found in pipeline construction.

The speed at which a pipejoint can be welded is determined by the maximum rate at which the welding torch can deposit weld metal while traversing a pipe joint which is in a nonhorizontal plane. While gas metallic arc (MIG) welding torches generally have a relatively high rate of metal deposition, such torches generally produce welds that are nonuniform and difficult to repeatably obtain. Gas tungsten arc (TIG) welding torches are known to produce a pipe joint weld of superior and more repeatable quality, although the metal deposition rate for TIG welding torches is relatively slow. A development known as the hot-wire TIG torch, in which electric current is passed through the filler wire to preheat the filler wire which is melted in the weld puddle, is known to produce a substantially increased rate of metal deposition, relative to conventional TIG welding. The lack of sufficiently precise and repeatable weld parameter control of prior-art hot-wire TIG welding torches, however, along with the aforementioned problem of off-axis weld puddle control and related problems, have heretofore kept the metal-deposition rates of hot-wire TIG torches from being fully realized in pipeline welding applications. A description of hot-wire TIG welding is set forth in U.S. Pat. No. 3,122,629.

Accordingly, it is an object of the present invention to provide an improved apparatus for welding along a predetermined path of workpieces such as pipe joints or the like.

It is another object of the present invention to provide apparatus for automatically welding pipe joints and the like, at an improved rate of metal deposition and with an improved quality of weld.

Still another object of the present invention is to provide a programmable welding system in which selected welding parameters are automatically varied in relation to welding torch position or other factors.

Stated in general terms, the present invention comprises a process and apparatus for traversing a weld joint with a welding torch along a path in proximately parallel relation to the joint, while controlling selected operating parameters of the welding torch. The desired values of the operating parameters at selected locations of the torch are predetermined, and signals corresponding to the desired operating parameters and torch locations are stored. The position of the torch along the weld path is sensed, and the sensed position is used to select the stored information that controls the operating parameters for each selected location of the torch.

The foregoing and other objects and advantages of the present invention will become more readily apparent from the disclosed preferred embodiment as described below with respect to the drawings, in which:

FIG. 2 is a block diagram showing the overall control system of the disclosed embodiment;

FIG. 3 is a section view, taken transverse to the weld pass direction, showing one example of a multiple-pass welded joint made with the present apparatus;

FIG. 4 is a partial circumferential section view, shown somewhat enlarged, of the weld of FIG. 2;

FIG. 5 shows an example of an operating sequence which the disclosed apparatus undergoes during a typical weld pass;

FIG. 6 is a block diagram of the control circuits for one of the four welding head assemblies;

FIG. 11 is a schematic diagram of the carriage control for one of the welding torch carriages of the present invention;

FIG. 12 shows typical DC welding volt-ampere curves which are obtainable with welding power supplies of the prior art; and FIG. 13 shows typical DC welding volt-ampere curves which are obtained with the welding current of the present invention.

Figure 1:
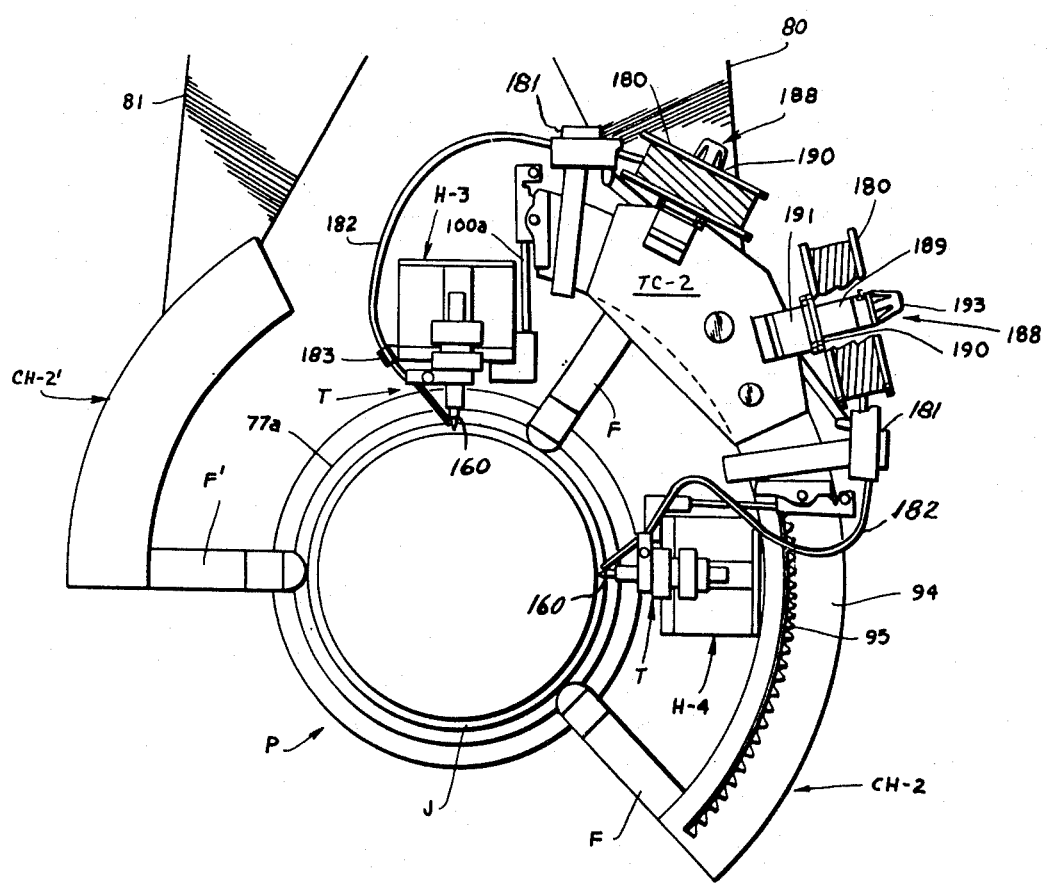
FIG. 1 is a vertical section view showing a disclosed embodiment of welding torch support and traversing apparatus according to the present invention.

Turning to FIG. 1, there is shown an example of automatic welding apparatus according to the present invention. A pair of clamp arms 80 and 81 are fragmentarily shown in FIG. 1, and terminate in half-clamps CH-2 and CH-2', which partially surround a pipe section P having a joint J to be welded. The half-clamps have clamp feet F, F, and F' which extend radially inwardly from the respective half-clamps to engage the ends 77a of the pipe P.

The half-clamps CH-2 includes a track 94 on which the movable carriage TC-2 is supported to traverse a portion of the pipe joint J. A rack gear 95 on the half-track CH-2 is utilized to drive the carriage about the arc-shaped track 94.

A pair of welding head assemblies H-3 and H-4 is connected to the carriage by support rods 100a, at each of the welding head assemblies carries a welding torch assembly T. Further details of the welding torch support apparatus and the pipe clamp assembly may be found by reference to co-pending application Ser. No. 654,975 filed Feb. 3, 1976, which is incorporated herein by this reference thereto.

The disclosed embodiment of the welding system utilizes four separate welding head assemblies, only two of which are depicted in FIG. 1. The other two torch assemblies H-1 and H-2 are carried on a separate movable carriage which traverses a separate arc segment of the joint J to be welded, and the mechanical details of those other welding head assemblies are substantially similar to assemblies H-3 and H-4. The disclosure of those mechanical details is available in the aforementioned co-pending application, although those details have been omitted from the present application as adding nothing of substance to the invention here disclosed and claimed.

Each torch assembly T which utilizes the aforementioned hot-wire process is supplied with filler wire from a separate spool 180 by way of a wire drive 181 and the flexible hollow guide tube 181 which conveys the feed wire to a point adjacent the lower end 160 of the torch assembly. Those skilled in the art will realize that a flow of electrical current, preferably AC, for $I^2R$ heating purposes is established between the filler wire and the weld puddle at the pipe joint J by passing the wire through an electrical contact tube 183 located adjacent the torch T.

Control System

The movement of each carriage TC about its respective clamp half occurs independently of the other carriage, although the relative positions of the carriages TC1 (not shown) and TC2 are interrelated for certain purposes. The operating parameters of each welding head assembly H1 through H4 are controlled independently of any other welding head assembly, with the values of the operating parameters being independently determined by factors such as the angular position of the carriage which supports the head assembly, sensed parameters, and preselected inputs for various parameters. Control of the overall system disclosed herein is provided through the control system shown generally in FIG. 2, in which a central processor 214 interfaces through the input/output means 215 with the control circuits 216a–216d independently associated with each of the welding head assemblies H1–H4. The central processor 214 also supplies signals through the interface 215 to the carriage control circuits 218-1 and 218-2, which individually drive the separate carriage positioning motors 96-1 and 96-2, and receives carriage position signals from the separate carriage position encoders 97-1 and 97-2.

A transverse section of a typical welded pipe line joint of the type attainable with the present apparatus is shown in FIG. 3, wherein the abutting ends 77a and 77b of pipe sections P and P′ have been prepared by grinding or otherwise removing metal to form the beveled surface 452 extending from the outer surface of the pipe inwardly to the land 453. The lands 453 extend circumferentially around unremoved portions 454 of pipe metal which are abutted to provide the root of the joint J to be welded.

The initial welding pass, or root pass, mechanically joins together the two abutting portions 454, and may penetrate the pipe sufficiently to provide the slightly convex bead 455 about the joint J within the pipe. The root pass need not extend completely between the confronting beveled surfaces 452. The next welding pass, or "hot pass", is applied over the root pass to reshape and anneal the root pass. In typical operation of the present welding apparatus, the welding torch assemblies do not oscillate while welding the root pass and the hot pass.

Following the hot pass, one or more filler passes are applied to substantially fill the joint J with weld metal. It will be understood that the weld parameters of each welding torch assembly should be selected to maximize the rate of filler metal deposition during the hot passes. The joint J is completed by covering the final filler pass with a pair of cap passes which overlap one another as shown at 457.

A section view of a typical joint J welded with the present apparatus is shown in FIG. 4. The root pass commences at 460 as the welding arc is established, and slopes outwardly to attain maximum thickness at point 461 as the welding head assembly commences to traverse a sector of the pipe, as indicated by the arrow 462. The apparent terminal overlapping portion 463 of the root pass is actually the unsloping initial portion of the root pass produced by welding head assembly H4 which was moved to the 12 o'clock position to commence welding at point 465 after H1 is moved out of position, as discussed above. The complete root pass and each subsequent pass includes four such overlapped joints disposed about the circumference of the joint J.

The hot pass commences at point 464, and each subsequent welding pass similarly starts and finishes on slopes to provide overlapping joints as shown in FIG. 4, so that the several weld passes smoothly overlap one another without abrupt step-shaped discontinuities. The starting and finishing slopes are provided by apparatus described below.

A typical example of a weld pass sequence with the present apparatus is shown in FIG. 5. A number of the weld parameters for any welding sequence, including the sequence depicted in FIG. 5, are predetermined for the particular weld pass and the type of joint, and are programmed to take place at selected points during the particular weld sequence. It should be understood that the weld parameters are "programmed" in the sense of being operator-predetermined, possibly by trial-and-error experimentation for a particular type and diamter of pipe, for example, as well as for each kind of welding pass to be used, the input into the system either by appropriate control settings or by information stored in a suitable memory and utilized throughout the selected weld sequence according to an appropriate operational program of the central processor 214. The level of computer programming ability necessary to accomplish such sequential operational programming of predetermined stored weld parameters is well within ordinary skill of the art.

The depicted weld sequence starts at a time indicated at 468 on FIG. 5, and may be initiated by any suitable manual control. The supply of coolant and shielding gas to each torch assembly T commences at time 468 and continues throughout the welding sequence. At the same time, each torch moves vertically inwardly as shown at 469, through operation of the automatic voltage control, until the torch contacts the joint J at time 470. After contacting the joint, each torch is independently retracted as indicated at 471 for a predetermined time and at a known rate which causes each torch to have a predetermined spacing from the joint, even though the clamp assemblies CA1 and CA2 may be essentially clamped onto the pipe.

Weld current is applied to each torch assembly at time 473, and an arc is initiated by any suitable technique such as a high-frequency arc starting circuit (not shown) or the like. The weld current starts at a relatively low value indicated at 474 and increases over a predetermined upslope time to reach a programmed value at time 472. The filler wire feed and heating power, as well as the torch automatic voltage control, remain off at this time, and carriage movement has not yet commenced.

The carriage commences movement at a programmed time 475 soon after maximum programmed weld current is attained, and the automatic voltage control is initiated at time 476 to maintain the arc voltage of each torch at a programmed level. The torch oscillation control, if required by the particular weld pass, is also initiated at time 476. The automatic voltage control allows each torch assembly to be alternately retracted and extended as the torch oscillates across the nonuniform depth of the weld joint J, as seen in FIG. 3, so that the arc spacing is automatically adjusted to maintain the programmed arc voltage throughout each oscillation of the torch assembly.

Filler wire feed and AC filler wire heating power commence at time 477, soon after carriage movement commences. It is apparent from FIG. 5 that both the speed at which the filler wire is fed into the weld puddle, and the AC power applied to heat the filler wire, are increased during an upslope time to the maximum programmed values of speed and voltage.

The depicted weld sequence is now fully underway, and the programmed value of carriage speed or any other weld parameter may be varied during the weld pass in response to the circumferential positions of the carriage assemblies, in accordance with "programmed" weld parameters that have previously been determined to be appropriate for the particular torch at various circumferential positions. The programmed weld parameters typically are separately predetermined, programmed, and controlled for each of the torch assemblies so that, for example, the size of an inverted weld puddle on the underside of the joint can be reduced to a point where surface tension and other natural forces acting on the molten metal exceeds the gravitational pull on the metal and prevents the puddle from dropping out of the joint, without similarly restricting the operating parameters of torch assemblies positioned elsewhere about the circumference of the joint.

At time 478 approaching the end of the depicted weld sequence, the automatic voltage control and torch oscillation are turned off and the weld current commences to decline from a programmed level to reach the final current level at time 479, at which point the carriage has reached the end of its programmed arc of travel. The filler wire feed and heating current also commence at time 478 to decrease over a downslope time to terminal levels at time 480, whereupon the feed wire is momentarily reversed to retract the wire from the still-molten weld puddle. It will be understood that the gradual downslope of depicted weld parameters, along with the programmed upslopes at the start of the weld sequence, produces the sloped and overlapped ends of the weld passes shown in FIG. 4. The weld sequence is completed at time 479, although coolant and shielding gas continue to flow through each torch assembly for the cool-down period 481 to allow the weld puddle to solidify. Each torch assembly may be retracted during this time, as shown at 482, and it will be understood that each carriage can now be returned to its programmed starting position to await commencement of the next weld sequence.

Each of the conrol circuits 216a–216d may be basically identical, and only a single such circuit 216a is described herein with reference to FIG. 6. The control circuit indicated generally at 216a includes a DC current control 222 which supplies a welding current control signal along the line 223 to the DC power supply for the torch assembly T associated with welding head assembly H1. The hot-wire power control 225a provides an output signal along the line 226 controlling AC power to heat the filler wire being supplied to the torch of the welding head assembly H1, and the wire feed control 225b provides a feed rate signal along the line 227 to the wire feed servomotor 184.

The automatic voltage control 229 provides signals along line 230 to the motor 117 which controls the vertical movement of welding head assembly H1. The automatic voltage control 229 receives an input signal on line 344 corresponding to the actual welding arc voltage of the torch T associated with welding head assembly H1, and provides an output signal along line 230 to adjust the vertical position of the torch as necessary to maintain a programmed arc voltage determined by an input signal supplied on line 340 to the automatic voltage control.

The oscillation control 233 supplies operating signals along the line 234 to the motor 139 which oscillates the welding head assembly H1 on a path which is transverse to the joint J.

Each of the DC current control 222, the hot-wire power supply control 225a, the wire feed control 225b, the automatic voltage control 229, and the oscillation control 233 receives command signals from the central processor 214 and input/output means 215 in response to factors such as the angular position of the carriage TC1, corresponding to desired welding parameters that have been manually or programmatically placed into the central processor. An Allen-Bradley programmable logic controller containing a 4096-word read/write memory provides the central processing function in an actual embodiment of the present invention, although any suitable programmable general-purpose computer can be used. The inputs to the control circuit 216a are received from the input/output means in digital form, and so each of the aforementioned controls is preceded by a digital-to-analog converter labeled "D/A" in FIG. 6. The hot-wire power control 225a receives an input for wire-heating current (which provides a coarse adjustment of filler wire deposition), and the filler wire feed control 225b receives an input for the filler wire feed rate (which provides a fine or trim adjustment of filler wire deposition). The oscillation control 233 similarly receives separate inputs for the rate and width of torch oscillation, and it will become apparent that the center of oscillation can be electronically adjusted through the oscillation control. Those skilled in the art will realize that the welding torch may not be oscillated during the initial passes of the pipe joint J, and that subsequent weld passes of the joint may require differing width and/or rate of oscillation of the torch.

Figure 7:
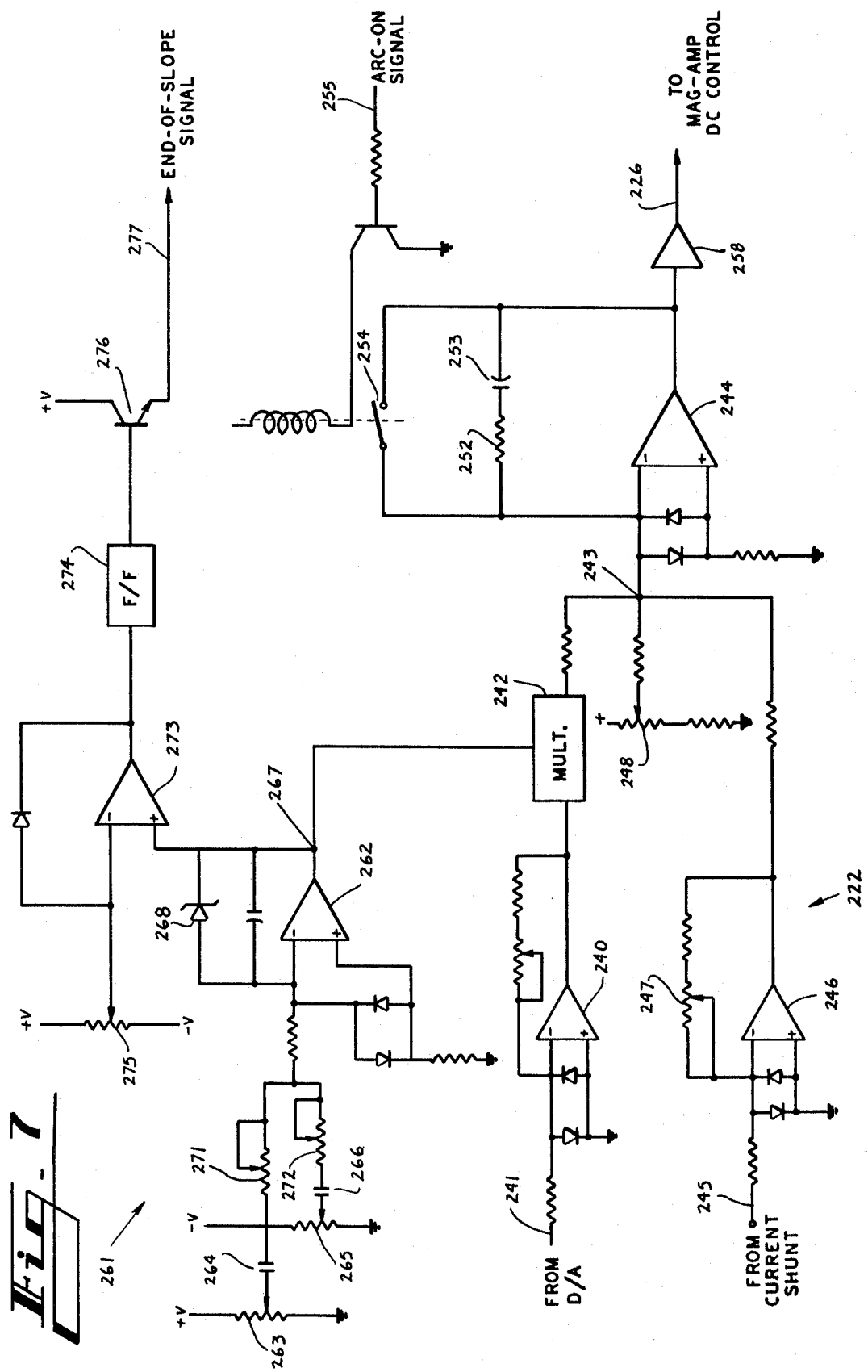
FIG. 7 is a schematic diagram of the DC welding current control for one of the welding head control circuits of the present invention.

The DC current control 222, as detailed in FIG. 7, includes an amplifier 240 which receives a weld current command signal on the line 241 from the corresponding digital/analog converter. The amplified weld current command signal goes to a multiplier circuit 242 for a purpose described below, and the output of the multiplier circuit is supplied to the summing point 243 associated with the input of the summing amplifier 244. A feedback signal corresponding to the actual DC welding current is obtained from a shunt (not shown) in series with the welding current supplied to the torch T, and the signal at 245 from the current shunt is amplified at 246 and also supplied to the summing point 243. Potentiometer 247 across the amplifier 246 provides feedback adjustment. The voltage level at the summing point 243 can be adjusted by the potentiometer 248.

The output from the summing amplifier 244 is determined by the difference, if any, between the welding current command signal on line 241 and the measured weld current signal on line 245. Resistance 252 and capacitance 253, series-connected in shunt across the summing amplifier 244, provide an integral plus proportional compensator which provides a zero output when the difference between the command and measured current signals is a steady-state value. Relay contact 254 is connected in shunt across resistance 252 and capacitance 253, and the contact 254 is opened only in response to a signal on line 255 (which may be obtained in the programmed weld sequence) denoting that the welding arc is turned on. The shunt contact 254 ensures that capacitance 253 will be discharged at the time welding current commences, so that no charge remains on the capacitance to provide a false welding current control signal.

The output signal from the summing amplifier 244 is amplified at 258 and supplied on the line 259 to control a conventional DC welding current source, such as a magnetic amplifier DC current control means. The described DC power control circuit provides AC line compensation while supplying a constant DC current to the welding torch. Feedback control of the DC power is accomplished through relatively low voltage signals that are compatible with the command signals provided by the input/output means 215 associated with the central processor. Static volt-ampere characteristics of a conventional open-loop, drooping characteristic DC welding current source are shown at 483 in FIG. 12. The constant-current static volt-ampere characteristics of the same welding current source operated with the present DC power control circuit are shown at 484 in FIG. 13.

The sudden application of full commanded welding current to the torch T can generate an arc of sufficient intensity to blast a hole in the workpiece, while the abrupt removal of welding current from the torch at the end of a pass can cause a crater in the weld metal. These unwanted effects are prevented by the weld current slope circuit indicated generally at 261 in FIG. 7, and including the amplifier 262 which supplies a control signal to the multiplier 242. The amplifier 262 receives an input signal either from the up-slope potentiometer 263 through normally-open contactor 264, or from the down-slope potentiometer 265 through normally-open contactor 266. The amplifier 262 functions as an integrator circuit, and the output at fixed point 267 is clamped by the zener diode 268 across the amplifier 262 to be not less than zero volts.

The contactor 264 is closed when a typical programmed welding sequence is initiated, as described above in greater detail, and the voltage at fixed point 267 is integrated from zero up to a level determined by the setting of potentiometer 263, and at a rate determined by the potentiometer 271 in series between the contactor 264 and the amplifier 262. The voltage at the point 267 is applied to the multiplier 242, so that the output from the multiplier to the summing point 243 is a product of the welding current command signal and the upwardly-increasing signal at fixed point 267. A predetermined minimum starting value for the welding current may be provided, if desired.

Approaching the end of a programmed welding sequence, the contactor 264 is opened and the contactor 266 is closed to cause the amplifier 262 to integrate the voltage at point 267 downwardly toward a final value determined by the setting of potentiometer 265, and at a rate determined by the potentiometer 272. The voltage at point 267 is also applied to the amplifier 273, which provides an output signal to the flip-flop 274 when the voltage at point 267 diminishes to a level determined by the setting of the down-slope termination potentiometer 275. The signal applied to the flip-flop 274 operates the transistor switch 276, providing along line 277 an end-of-slope signal which denotes that the welding operation is terminated for a particular welding head assembly. The setting of the down-slope termination potentiometer 275 thus selects the minimum welding current at which the arc is extinguished.

Figure 8:
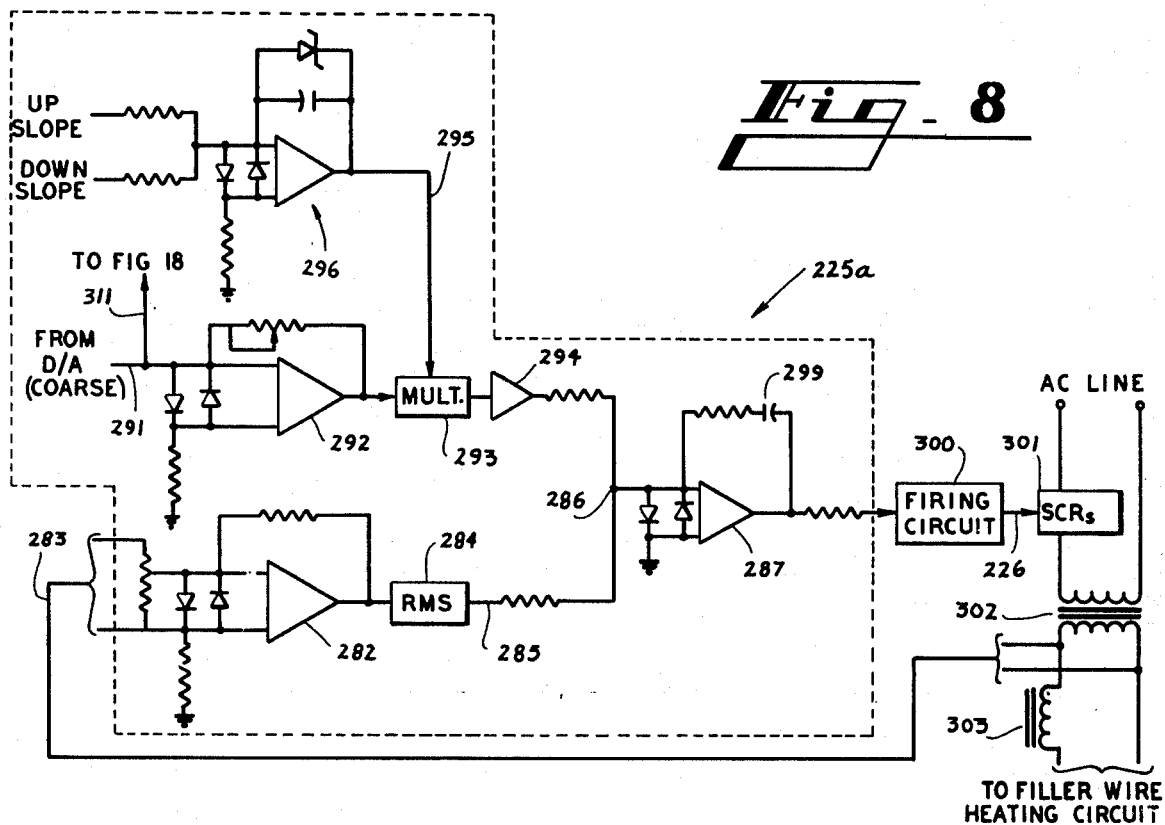
FIG. 8 is a schematic diagram of the AC filler wire heating power control for one of the welding head control circuits of the present invention.

The hot-wire current control 225a is shown in FIG. 8, and includes the amplifier 282 receiving an input signal supplied by line 283 and corresponding to the actual AC voltage supplied to heat the filler wire at the torch T associated with the particular welding head assembly. Output from the amplifier 282 goes to the RMS circuit 284, which supplies along line 285 an output signal proportional to the RMS value of the AC heating current signal on line 283. The RMS signal on line 285 is supplied to the summing point 286 of the summing amplifier 287.

An AC heating voltage command signal supplied from the central processor 214, through the appropriate digital/analog converter, is supplied on the line 291 to the amplifier 292, the output of which is supplied to the multiplier circuit 293. The output from the multiplier circuit 293 is amplified at 294 to provide a filler wire heating command signal which is supplied to the summing point 286. The multiplier circuit 293 receives a control signal along the line 295 from the upslope/downslope circuit 296, which functions in a manner similar to the slope circuit 261 described with respect to FIG. 7.

The summing amplifier 287 is bypassed by the series resistance-capacitance circuit 299 to provide integral plus proportional compensated output to a conventional firing circuit 300 which sets the firing angle of SCRs 301 connected in the primary circuit of the transformer 302. The secondary winding of the transformer 302 is connected in series with the inductor 303 to supply heating current to the filler wire heating circuit. The inductor 303 provides the desired voltage-current slope of power supplied to heat the filler wire, and such inductors are known to those skilled in the art. The voltage across the secondary winding of the transformer 302 is fed back along the line 283 to provide the input signal to the amplifier 282.

The AC power control circuit 225a functions to provide an output signal from the summing amplifier 287 to the firing circuit 300 which will maintain the RMS output voltage from the transformer 302 at a level which is determined by the AC power command signal supplied on the line 291. The AC power supply to heat the filler wire is applied on an upslope at the commencement of welding and is terminated on a downslope near the end of welding, by the circuit 296, in a manner that is analogous to the upslope and downslope of DC welding current as described above. The described AC power control circuit provides AC line compensation while supplying a constant RMS AC voltage to the filler wire for $I^2R$ heating. Feedback control of the AC power is accomplished through relatively low voltage signals that are compatible with the command signals provided by the input/output means 215 associated with the central processor.

Figure 9:
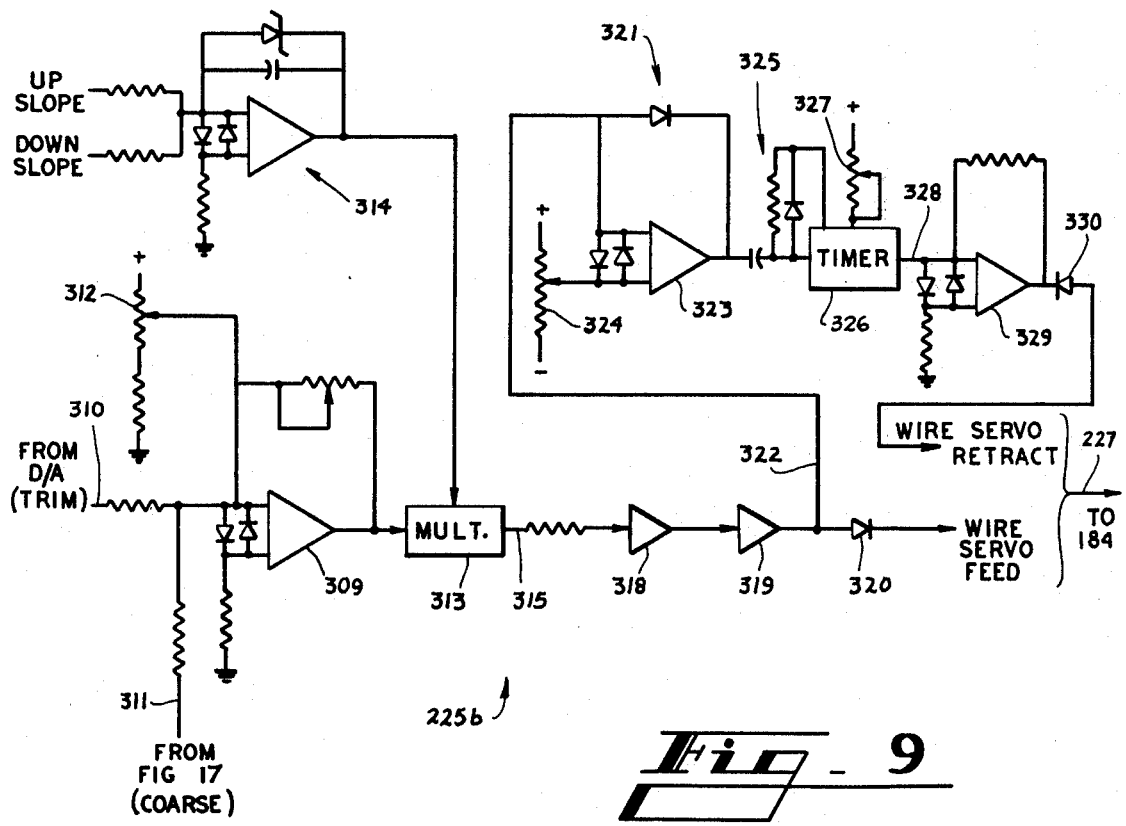
FIG. 9 is a schematic diagram of the filler wire feed control for one of the welding head control circuits of the present invention.

The wire feed control 225b, shown in FIG. 9, includes an amplifier 309 connected to receive an input command signal on the line 310 from the appropriate digital/analog converter. The filler wire feed rate command signal on the line 310 is interconnected through the line 311 with the filler wire heating power command signal supplied on line 291, FIG. 8, so that control of the filler wire heating power and feed rate are operationally interrelated. It will be understood that a commanded increase in the feed rate of the filler wire will require a corresponding increase in the AC power necessary to maintain the desired heating rate of the filler wire; a commanded change in the AC heating power will necessitate a corresponding adjustment in the feed rate of the filler wire.

The potentiometer 312 provides a scale adjustment input to the amplifier 309, and the output of the amplifier goes to the multiplier circuit 313. The upslope/downslope circuit shown generally at 314 also provides an input to the multiplier circuit 313 to modify the wire feed command signal in a manner similar to the slope adjustment circuits described above, so that the output of the multiplier circuit on line 315 provides a reference signal corresponding to commanded or desired wire feed rate.

The signal on the reference line 315 is amplified at 318 and 319, and supplied through diode 320 to a servoamplifier which drives the wire feed servomotor 184 corresponding to the particular weld head assembly. The wire feed servoamplifier may include an operational input which receives the feed command signal as aforementioned, and also a velocity feedback signal generated by a tachometer integral with the wire feed servomotor.

When the filler wire feed is terminated at or near the end of a welding operation, the filler wire conventionally remains in the molten weld puddle and adheres thereto, or forms a ball of molten metal at the end of the filler wire, either of which requires manual intervention of an operator. That problem is overcome with the automatic filler wire retract circuit as shown generally at 321, in which the wire feed signal from amplifier 319 is supplied along line 322 to an input of the amplifier 323. An adjustable bias from the potentiometer 324 is maintained on the amplifier 323, and the output of that amplifier is supplied through the RC differentiator circuit 325 to the timing circuit 326. Potentiometer 327 adjusts the period of the timer 326.

During normal commanded wire feed, the signal on the line 322 overcomes the bias on the amplifier 323 and no operating output is supplied through the differentiator 325 to the timer 326. As programmed downslope of the commanded wire feed rate occurs while approaching the end of a weld cycle, however, the voltage on the line 322 decreases to a point where the amplifier 323 commences providing an output signal which is differentiated at 325 and activates the timing circuit 326 to provide an output signal on the line 328 for a time determined by the setting of potentiometer 327. The signal on the line 328, as amplified at 329 and passed through diode 330 to the filler wire servoamplifier, has opposite polarity to the wire heating signal supplied through the diode 320. The filler wire servomotor responds to the signal from the servoamplifier by reversing direction, for a time determined by potentiometer 327, to retract the filler wire from the weld puddle. In that manner, the filler wire is withdrawn from the weld puddle before forming a ball or becoming entrapped in the solidified puddle.

Figure 10:
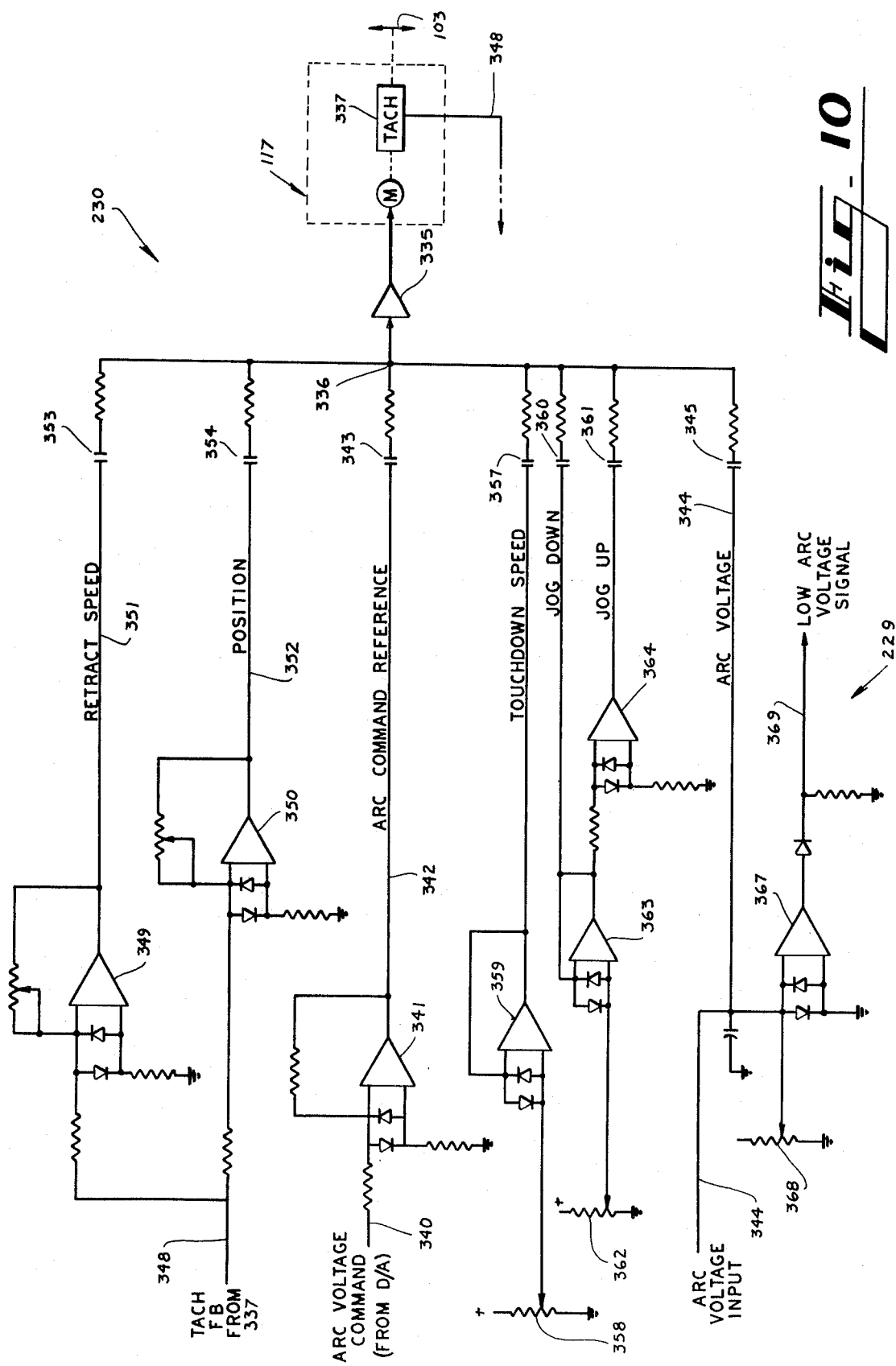
FIG. 10 is a schematic diagram of the automatic voltage control for one of the welding head control circuits of the present invention.

The automatic voltage control 229 is shown in FIG. 10 in relation to the motor 117 which drives a typical weld head assembly H1 for movement along the vertical path 103, and it will be seen that the motor 117 in the disclosed embodiment is a servomotor including an output tachometer 337. Input to the summing amplifier 335 is obtained from the summing point 336, which selectively receives signals from one or more sources as contained in the following description of the automatic voltage control circuit.

The arc voltage command signal is received on line 340 from the appropriate digital/analog converter, and applied through the amplifier 341 to provide an arc voltage command reference signal on the line 342. The arc voltage command signal can be supplied through the switch contact 343 to the summing point 336. Measured arc voltage may also be applied to the summing point 336 along the line 344 and the switch contact 345, and it will be understood that the summing amplifier 335 controls the servomotor 117 to change the vertical spacing between welding torch and pipe joint J in response to a difference between the arc voltage command signal on line 342 and the measured arc voltage signal on line 344. The vertical position of welding head assembly H1 is thus automatically adjusted as necessary to maintain a commanded arc voltage as that welding head assembly is traversed around the pipe joint J, so that predetermined arc voltage for the particular welding head assembly is maintained notwithstanding slight eccentricity between the pipe axis and the particular clamp assembly CA. Of course, the commanded arc voltage input on line 340 can be changed for various circumferential positions of each welding head assembly, and/or for particular welding passes, independently of any other welding head assembly, thereby producing a corresponding change in the vertical position of the welding head assembly to provide the commanded arc voltage.

Rate stabilization of the servomotor 117 is provided by feeding back the velocity signal from the tachometer 337 through the line 348 to the parallel feedback circuits including the amplifiers 349 and 350. The outputs of the amplifiers 349 and 350 are supplied along lines 351 and 352 to the summing point 336 through respective switching contacts 353 and 354. The contact 354 is closed to provide rate feedback along the line 352 during an on-going welding operation as aforementioned.

At initiation of a welding operation, as is more apparent from the sequence example discussed above, each welding head assembly is initially moved downwardly until the electrode contacts the joint J. Downward movement is accomplished by closing the switching contact 357 to apply to the summing point 336 a work touchdown speed voltage derived from the potentiometer 358 and the amplifier 359. Rate feedback is applied to the summing point 336 through the closing of switching contact 353. Thus in the touchdown mode the servomotor 117 operates as a precision velocity servo while in the normal weld mode it functions as a position servo. When the torch electrode contacts the pipe joint or other workpiece, as detected by any suitable technique such as the establishment of electrical continuity between the electrode and the workpiece, the contact 357 is opened and the contact 353 is closed to provide a head retract signal which drives the servomotor 117 to move the welding head assembly away from the workpiece at a predetermined retraction speed. The welding head assembly can thus be retracted from the workpiece for a predetermined time by suitable timing apparatus (not shown), at a predetermined rate provided by the feedback circuit including amplifier 349 and line 351, so that the welding head assembly can be retracted to a known location with respect to the workpiece immediately below the torch electrode. The servomotor 117 operates in the retract mode as a precision velocity servo as described above for the touchdown mode.

Additional velocity signals are selectively applied to the summing point 336 through the switching contacts 360 and 361, as obtained through the potentiometer 362, the amplifier 363, and the amplifier 364, to jog the particular welding head assembly up or down in response to a suitable manually-operated jog input control.

The measured arc voltage on line 344 is also supplied as an input to the comparison circuit 367, which receives a minimum arc voltage reference signal from the potentiometer 368. When the measured arc voltage on line 344 falls below a minimum arc voltage as determined by the setting of the potentiometer 368, a low arc voltage signal is applied on line 369. The low arc voltage may be used through suitable control logic to interrupt the welding sequence for the particular welding head assembly.

Turning to the description of a typical carriage control circuit 218--1 as shown in FIG. 11, it is seen that carriage TC1 is driven by a motor 96-1 comprising a servomotor and a tachometer generator 373. An input summing amplifier 374 operates in response to the sum of voltages applied to the summing point 375. Forward travel of the carriage during a welding sequence is obtained in response to a carriage command signal applied on line 376, from the appropriate digital/analog converter, through amplifier 377 to provide a carriage drive command reference signal through switch contact 378 to the summing point 375. Rate feedback of the carriage servomotor 96 is obtained by applying a rate signal from the tachometer 373 as an input on line 373' to amplifier 379, for return to the summing point 375 through switching contact 380.

Upon the completion of carriage travel at the end of a welding cycle, it is desirable to return the carriage to a predetermined initial position at a relatively high return speed. Rapid carriage return is obtained through the return speed control circuit including the potentiometer 384, the amplifier 385, and the switch contact 386 which is closed, either manually or by appropriate logic means, after all welding head assemblies of the particular carriage have completed their respective welding sequences for a particular pass of the carriage.

The carriage can also be jogged in the forward or reverse directions, by respective closure of switching contacts 387 or 388, through jog rate circuitry including the potentiometer 389, the jog reverse amplifier 390, and the jog forward amplifier 391. It will be understood that the switching contacts 387 and 388 for jog control may be operated in response to an appropriate manual input.

Details of the structure and function for the torch oscillation control 233 are set forth in the aforementioned co-pending application Ser. No. 654,958. Those details are incorporated herein by this reference thereto. It will be understood, as shown in that co-pending application, that the rate and width command signals for the torch oscillation control are provided from the central processor 214 in the same manner that other parameter command signals are supplied to the various control circuits.

Where a particular welding station such as stations A or B herein performs separate kinds of weld passes in succession, such as root pass followed by hot pass, the predetermined weld parameters for each kind of weld pass are programmed as aforementioned and then those weld parameters for a specific weld pass are selected to control that weld pass. Weld pass selection, which determines the set of preprogrammed weld parameters to be used, may be operator-controlled or semiautomatic (for example, with a counter which advances to select the programmed weld parameters for the next weld pass). It follows that a single welding station can perform each weld pass for a complete welded joint, by appropriate programming for the sets of weld parameters for each weld pass, so that a multiple-station pipe laying facility can remain in operation although one of the welding stations may be inoperative.

It should be understood that the disclosed use of the present invention to weld a vertical-plane joint about horizontal pipe is by way of example only, since the present invention is readily adaptable for automatic welding along any path in response to preprogrammed weld parameters chosen for the weld path.

It will be understood that the foregoing relates only to a preferred embodiment of the present invention, and that numerous changes and modifications may be made therein without departing from the spirit and the scope of the invention as set forth in the following claims.

We claim:

1. The process of arc welding a joint along a path while the size of the weld puddle in the joint is selectably adjusted in response to location of the arc along the path, comprising the steps of:

establishing an electric arc with the material being welded so as to create a weld puddle of molten metal at a location on the joint;

moving the arc to traverse the path being welded;

supplying preheated filler metal to said weld puddle while moving said arc; and adjusting the amount of supplied filler metal by controlling the preheating of said filler metal and the rate at which said preheated filler metal is supplied to said weld puddle, in response to a selectably variable function of the location of said arc along said path, so that the size of said weld puddle at each location on the path is adjustable to the puddle size previously determined for said locating along said path.

2. The process of claim 1, wherein said welding occurs about a circumferential joint of a pipe, and said arc is moved along a circular path approximately concentric with said joint.

3. The process of claim 1, wherein said electric arc is a nonpulsed electric arc.

4. The process of arc welding a joint along a path while the size of the weld puddle in the joint is selectably adjusted in response to the location of the arc along the path, comprising the steps of:

establishing an electric arc with the material being welded so as to create a weld puddle of molten metal at a location on the joint;

moving the arc to transverse the path being welded;

supplying preheated filler metal to said weld puddle while moving said arc; and adjusting the amount of said filler metal by controlling the preheating of said filler metal in response to a selectably variable function of the location of said arc along said path, so that the size of said weld puddle at each location on the path is adjusted to the puddle size previously determined for said locations along said path.

* * * * *